United States Patent
Ryu et al.

(10) Patent No.: US 11,250,150 B2
(45) Date of Patent: Feb. 15, 2022

(54) FILE SYNCHRONIZATION AND CENTRALIZATION SYSTEM, AND FILE SYNCHRONIZATION AND CENTRALIZATION METHOD

(71) Applicant: MWSTORY Co., Ltd., Seoul (KR)

(72) Inventors: Dae Gull Ryu, Seoul (KR); Sang Won Woo, Namyangju-si (KR)

(73) Assignee: MWSTORY CO., LTD., Seoul (KR)

( * ) Notice: Subject to any disclaimer, the term of this patent is extended or adjusted under 35 U.S.C. 154(b) by 414 days.

(21) Appl. No.: 16/473,837

(22) PCT Filed: Nov. 28, 2017

(86) PCT No.: PCT/KR2017/013648
§ 371 (c)(1),
(2) Date: Jun. 26, 2019

(87) PCT Pub. No.: WO2018/124496
PCT Pub. Date: Jul. 5, 2018

(65) Prior Publication Data
US 2020/0125755 A1    Apr. 23, 2020

(30) Foreign Application Priority Data

Dec. 30, 2016 (KR) .......................... 10-2016-0184239

(51) Int. Cl.
*H04L 29/06* (2006.01)
*G06F 21/62* (2013.01)
*G06F 16/178* (2019.01)

(52) U.S. Cl.
CPC ........ *G06F 21/6218* (2013.01); *G06F 16/178* (2019.01); *H04L 63/102* (2013.01)

(58) Field of Classification Search
CPC ... G06F 21/6218; G06F 16/178; H04L 63/102
(Continued)

(56) References Cited

U.S. PATENT DOCUMENTS 9,852,149 B1 * 12/2017 Taylor ................ G06F 11/2089
2007/0143827 A1 * 6/2007 Nicodemus ......... G06F 21/6218
726/2

(Continued)

FOREIGN PATENT DOCUMENTS

JP     2002-518716    6/2002
KR    10-0740682     7/2007
(Continued)

*Primary Examiner* — Shin-Hon (Eric) Chen
(74) *Attorney, Agent, or Firm* — Lex IP Meister, PLLC

(57) ABSTRACT

The present invention provides a file synchronization and centralization system and a file synchronization and centralization method, which forcibly transmit, to a central server, data corresponding to a synchronization condition, among data being operated or data having been operated, and deletes the transmitted data from a PC, thereby making it impossible to transfer the data (including files and documents) to the outside or completely blocking a route through which the data can be attacked by ransom ware. The file synchronization and centralization system includes a central server and a PC. The central server includes a storage for storing data, and the PC accesses the central server by receiving access authority from the central server

3 Claims, 2 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2009/0313702 | A1* | 12/2009 | Mandava | ................ G06F 16/16 |
| | | | | 726/27 |
| 2014/0052689 | A1* | 2/2014 | Ficara | ................... G06F 16/178 |
| | | | | 707/610 |
| 2014/0282857 | A1* | 9/2014 | White | ....................... G01S 5/00 |
| | | | | 726/1 |
| 2016/0196324 | A1* | 7/2016 | Haviv | ................... G06F 3/0649 |
| | | | | 707/626 |

FOREIGN PATENT DOCUMENTS

| | | |
|---|---|---|
| KR | 10-2009-0024336 | 3/2009 |
| KR | 10-1178280 | 8/2012 |
| KR | 10-2015-0071915 | 6/2015 |

\* cited by examiner

[FIG. 1]
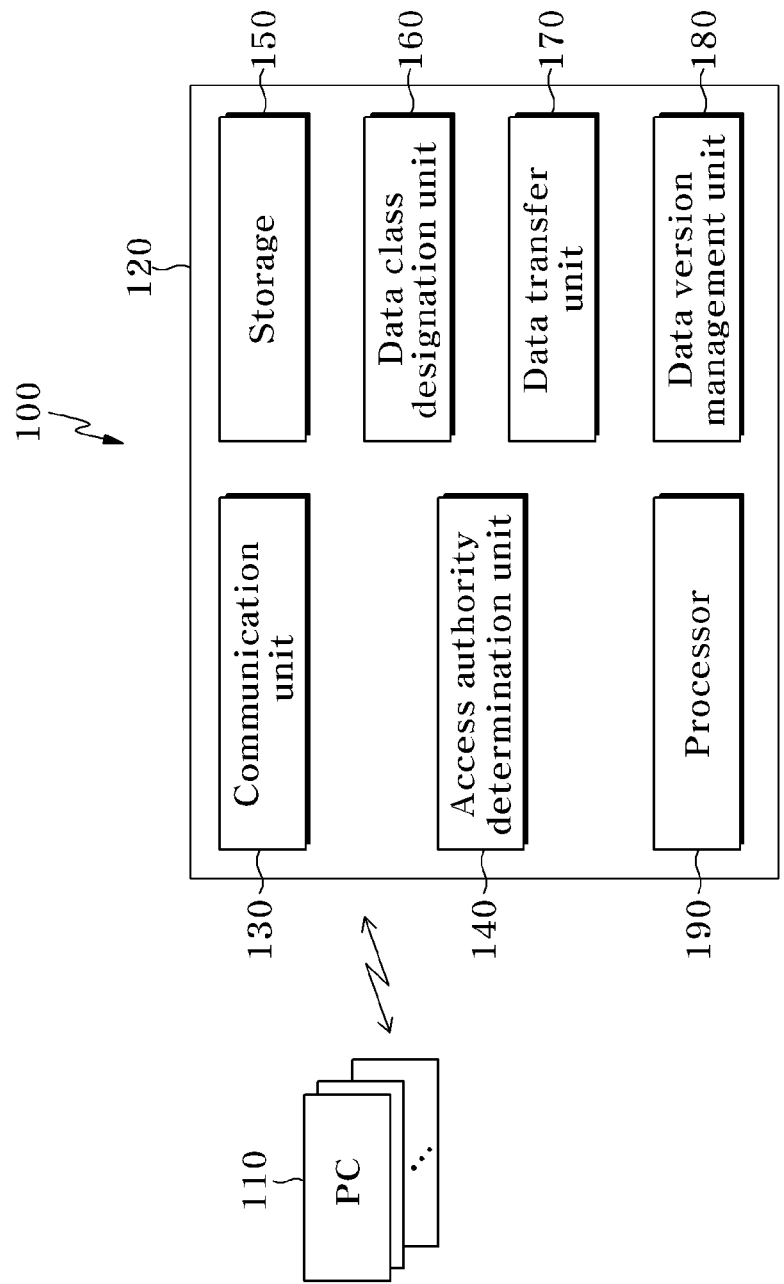

[FIG. 2]
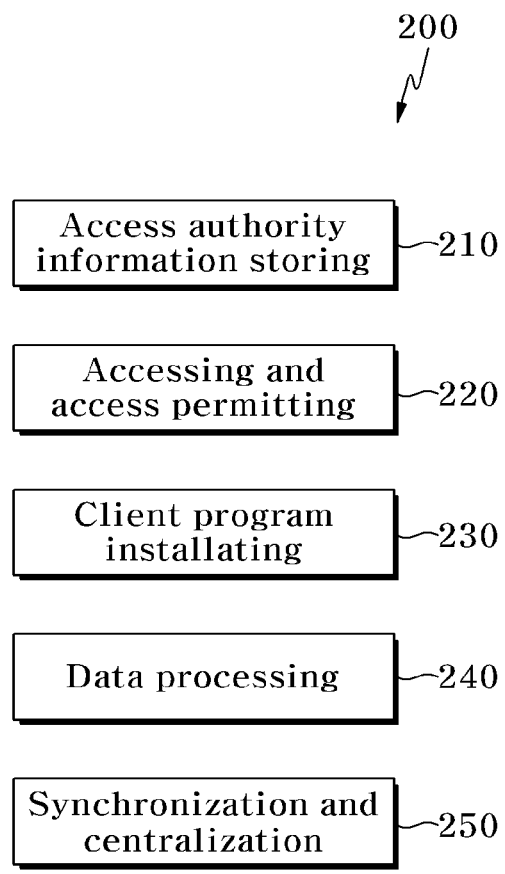

FILE SYNCHRONIZATION AND CENTRALIZATION SYSTEM, AND FILE SYNCHRONIZATION AND CENTRALIZATION METHOD

TECHNICAL FIELD

The present invention relates to synchronization and centralization of files (data), and more particularly, to a file synchronization and centralization system, which forcibly transmits, to a central server, data corresponding to a synchronization condition, among data being operated or data having been operated, and deletes the transmitted data from a PC, thereby making it impossible to transfer the data (including files and documents) to the outside or completely blocking a route through which the data can be attacked by ransom ware.

BACKGROUND ART

A file synchronization technology refers to a technology of matching files in two or more positions to each other, and a concept including bidirectional synchronization as well as unidirectional synchronization. The unidirectional synchronization means that the synchronization is performed only in one direction and a change is performed only at a place. On the other hand, the bidirectional synchronization means that the files are copied in two directions and the synchronization of the files is maintained at two locations corresponding to each other.

A backup technology refers to the act of copying files or a database in case of failure of computer equipment or other unexpected accidents. Most businesses that operate large computers are required to perform backup operations. An automatic backup technology is a technology that automatically backs up data in real time and at predetermined time intervals, and the backed up data can be restored to its original state to be connected at any time when necessary.

Centralization of files (or documents, hereinafter referred to as "files") is to centralize, and store and manage the files operated on a local PC to a data storage of a central server, and the need thereof has recently increased for systematic management and security enhancement of critical data. In order to implement the file centralization, a file synchronization technology is also needed through file transmission/ reception between the central server and the local PC.

In recent years, the file centralization has been evolved into a work process innovation business, not merely a centralized management of important corporate files, and has been developed to reinforce security by systemically managing all files produced and distributed in the business and reinforce an enterprise contents management (ECM) concept easily making the cooperation.

The ransom ware is a malicious program that unauthorizedly encrypts documents and photos stored on a PC to prevent the encrypted documents and photos from being opened. Methods such as requiring money to solve the malicious program and the emergence of targeted ransom ware attacks aiming at companies to maximize profitability have been evolved.

Recently, document centralization has attracted attention as an effective solution for the ransom ware. In addition to original functions such as document leakage prevention and document caplitalization, document centralization has attracted attention while revealing talents hidden in ransom ware defense. It was said in an article that "even if, for the structure of the document centralization for storing and managing document files and the like in the central server, a PC is infected with the ransom ware, it is assessed that the central server itself is not at risk of being taken hostage".

Although the document centralization solution is not a security product to prevent malicious code infections, work results are stored in a central document management server rather than an individual employee PC where the work is performed. Accordingly, even if the ransom ware operates on the PC, it is easy to expect that there will be no file to be taken hostage, so that it will be effective to cope with the ransom ware.

In addition, since additional authority and approval of a senior person are required for the use and modification of the document, external transfer, etc., unauthorized file tampering and encryption are prevented even when the ransom ware is infiltrated into a shared network or a central storage itself is infected.

In the related art, there is Korean Patent Registration No. 10-1178280.

DISCLOSURE

Technical Problem

An object of the present invention is to provide a file synchronization and centralization system, which forcibly transmits, to a central server, data corresponding to a synchronization condition, among data being operated or data having been operated, and deletes the transmitted data from a PC, thereby making it impossible to transfer the data (including files and documents) to the outside or completely blocking a route through which the data can be attacked by ransom ware.

Another object of the present invention is to provide a file synchronization and centralization method, which forcibly transmits, to a central server, data corresponding to a synchronization condition, among data being operated or data having been operated, and deletes the transmitted data from a PC, thereby making it impossible to transfer the data (including files and documents) to the outside or completely blocking a route through which the data can be attacked by ransom ware.

Technical Solution

According to an aspect of the present invention to achieve the objects, a file synchronization and centralization system includes a central server and a PC. The central server includes a storage for storing data, and the PC accesses the central server by receiving access authority from the central server. The PC monitors data in a specific area of the PC, transmits data corresponding to a predetermined synchronization condition to the central server, and operates a client program to delete the data transmitted to the central server from the PC, and the central server includes a server program to determine whether the access of the PC is permitted when the PC accesses the central server, confirm the class of the PC to which the access is permitted to designate a data class reflecting the class of the PC corresponding to the data to be transmitted from the corresponding PC, and then store the data in the storage, and store data class identification information processing the data class in the storage or a separate storage.

According to another aspect of the present invention to achieve the objects, a file synchronization and centralization method includes an access authority information storing step, an accessing and access permitting step, a client program installing step, a data processing step, and a synchronization and centralization step. In the access authority information storing step, access authority information including information on the PC that is authorized to access the central server and a class of the PC of which the access is permitted is stored in an access authority determination unit of the central server. In the accessing and access permitting step, when the PC attempts to access the central server through a communication network, whether the access of the corresponding PC is permitted is determined using the access authority information stored in the access authority determination unit. In the client program installing step, the client program is forcibly installed in the PC of which the access is permitted by the central server. In the data processing step, the PC accessing the central server performs the operation by copying the data stored in the storage to the PC within a range allowed by the own class or generates new data (file) irrespective of the data stored in the storage. In the synchronization and centralization step, data corresponding to the synchronization condition is forcibly transmitted to the central server in a PC accessing the central server and performing a predetermined operation, and the data transmitted to the central server is forcibly deleted from the PC.

Advantageous Effects

According to the file synchronization and centralization system and the file synchronization and centralization method of the present invention described above, it is possible to forcibly transmit, to a central server, data corresponding to a synchronization condition, among data being operated or data having been operated, and delete the transmitted data from a PC, thereby making it impossible to transfer the data (including files and documents) to the outside or completely blocking a route through which the data can be attacked by ransom ware.

DESCRIPTION OF DRAWINGS

FIG. 1 illustrates a configuration of a file synchronization and centralization system according to the present invention.
FIG. 2 illustrates a file synchronization and centralization method according to the present invention.

BEST MODE

In order to sufficiently appreciate the present invention, operational advantages of the present invention, and objects achieved by exemplary embodiments of the present invention, accompanying drawings illustrating the exemplary embodiments of the present invention and contents disclosed in the accompanying drawings should be referred.

Hereinafter, preferred exemplary embodiments of the present invention will be described in detail with reference to the accompanying drawings. Like reference numerals illustrated in the respective drawings designate like members.

FIG. 1 illustrates a configuration of a file synchronization and centralization system according to the present invention.

Referring to FIG. 1, a file synchronization and centralization system 100 according to the present invention includes a plurality of PCs 110 and a central server 120.

The PC 110 accesses the central server 120 through a communication network (not illustrated), and the central server 120 determines whether or not the PC 110 requesting an access is accessed using pre-stored access authority information, so that a relationship between the PC 110 and the central server 120 is started.

The central server 120 includes a communication unit 130, an access authority determination unit 140, a storage 150, a data class designation unit 160, a data transfer unit 170, and a data version management unit 180.

The communication unit 130 performs bidirectional communication with the PC 110.

The access authority determination unit 140 determines whether or not the access to the PC 110 accessing through the communication unit 130 is permitted by using the pre-stored access authority information and confirms a class of the PC to which the access is permitted. Here, the class of the PC depends on a position of a person using the PC or a secret approval acquisition level of the PC and for example, may be divided into top-secret, confidence, and general.

The data class designation unit 160 designates a data class that reflects the class of the PC that has transmitted the data to the data transmitted through the communication unit 130 and the access authority determination unit 140. The data class may be automatically designated to the corresponding data according to a server policy, but an operator who creates the corresponding data or a higher manager may designate the data class for each data. Different classes may be designated to different kinds of data generated by the same person, so that the data may be created and also the data class may be designated by authorized persons. For example, if the same person creates a vacation plan together with an important drawing, the drawing may be classified as a top-secret document and the vacation plan may be classified as a general document.

The data transfer unit 170 stores, in the storage 150, the data and the data class passed through the communication unit 130, the access authority determination unit 140, and the data class designation unit 160.

The data version management unit 180 checks whether the same data as the data to be stored in the storage 150 exists in the storage 150 by the data transfer unit 170. And when it is determined that the same data as the data to be stored exists in the storage 150, the data version management unit 180 changes a name of the data to be stored in the storage 150 to another name which may be distinguished from the name of the data pre-stored in the storage 150.

The processor 190 determines whether or not the access of the PC 110 is permitted when the PC 110 accesses the central server 120 according to an installed server program (not illustrated), confirms the class of the PC of which the access is permitted to designate a data class reflecting the class of the corresponding PC to the data transmitted from the corresponding PC, and then stores the data in the storage 150, and stores data class identification information processing the data class in the storage 150 or a separate storage (not illustrated).

The PC 110 monitors data in a specific area of the PC 110 and forcibly transmits data corresponding to a predetermined synchronization condition to the central server 120, and the data transmitted to the central server 120 operates in accordance with a client program to be deleted from the PC 110. Here, an example that the client program is already installed in the PC before accessing the central server 120, or forcibly installed in the PC by the central server 120 when accessing the central server 120 is possible.

The client program is forcibly transmitted to the central server 120 when the data corresponding to the synchronization condition is created or completed editing on the PC, and then the transmitted data is deleted from the PC, and in this case, the time when the data transmitted to the central server 120 is deleted by the client program may be variously selected as follows. This is just after the data is generated on the PC, or when the edition is completed, when the PC is logged off, when the system is rebooted, or when the system is terminated.

In the case that the authority of the client program installed on the PC is not the same level as the manager's authority, when the PC is logged off, the system is rebooted, and the system is terminated, it is possible to acquire the deletion authority internally and delete the corresponding data (file).

The synchronization condition is whether or not, the data that should not be transferred without permission, such as office document files, drawing files, program source files, among the data (including the files) to be worked in the individual PC, is stored in the PC. Generally, it is preferable that all the files except the file (data) automatically generated by an operating system of the PC are included in the synchronization condition.

The data class identification information is information obtained by mapping a unique value such as a hash value of data to be stored and a class designated to the data to be stored in the storage 150.

FIG. 2 illustrates a file synchronization and centralization method according to the present invention.

Referring to FIG. 2, a file synchronization and centralization method 200 according to the present invention includes an access authority information storing step (210), an accessing and access permitting step (220), a client program installing step (230), a data processing step (240), and a synchronization and centralization step (250).

In the access authority information storing step (210), access authority information including information on the PC that is authorized to access the central server 120 and a class of the PC of which the access is permitted is stored in the access authority determination unit 140 of the central server 120.

In the accessing and access permitting step (220), when the PC 110 attempts to access the central server 120 through a communication network (not illustrated), whether the access of the corresponding PC is permitted is determined using the access authority information stored in the access authority determination unit 140.

In the client program installing step (230) performed by the central server 120, the client program is forcibly installed in the PC 110 of which the access is permitted.

In the data processing step (240), the PC 110 accessing the central server 120 performs the operation by copying the data stored in the storage 150 to the PC within a range allowed by the own class or generates new data (file) irrespective of the data stored in the storage 150.

In the synchronization and centralization step 250 performed in accordance with the client program, data corresponding to the synchronization condition is forcibly transmitted to the central server 120 in a PC accessing the central server 120 and performing a predetermined operation, and the data transmitted to the central server 120 is forcibly deleted from the PC.

Reference numeral 110 denotes a PC, reference numeral 120 denotes a central server, reference numeral 130 denotes a communication unit, reference numeral 140 denotes an access authority determination unit, reference numeral 150 denotes a storage, reference numeral 160 denotes a data class designation unit, reference numeral 170 denotes a data transfer unit, reference numeral 180 denotes a data version management unit, reference numeral 190 denotes a processor, reference numeral 210 denotes an access authority information storing step, reference numeral 220 denotes an accessing and access permitting step, reference numeral 230 denotes a client program installing step, reference numeral 240 denotes a data processing step, and reference numeral 250 denotes a synchronization and centralization step.

The technical spirit of the present invention has been described together with the accompanying drawings hereinabove, but this exemplarily describes a preferred embodiment of the present invention and does not limit the present invention. Further, it is apparent to all those skilled in the art that various modifications and imitations can be made within the range without departing from the scope of the technical spirit of the present invention.

The invention claimed is:

1. A file synchronization and centralization system comprising:
    a central server including a storage storing data; and
    a Personal Computer (PC) accessing the central server by receiving access authority from the central server,
    wherein the PC monitors data in a specific area of the PC, transmits data corresponding to a predetermined synchronization condition to the central server, and operates a client program to delete the data transmitted to the central server from the PC, wherein the client program is forcibly installed in the PC by the central server when accessing the central server, and
    the central server includes
    a storage device;
    a communication unit which performs bidirectional communication with the PC;
    an access authority determination unit which determines whether or not the access of the PC accessing through the communication unit is permitted by using pre-stored access authority information and confirms a class of the PC to which the access is permitted;
    a data class designation unit which designates a data class to the data transmitted through the communication unit and the access authority determination unit by reflecting the class of the PC that has transmitted the data or reflecting a class designated by a person authorized to designate the class to the data;
    a data transfer unit which stores, in the storage, the data and the data class passed through the communication unit, the access authority determination unit, and the data class designation unit; and
    a processor which controls operations of the storage, the communication unit, the access authority determination unit, the data class designation unit, and the data transfer unit in response to a server program, and
    the central server includes the server program to determine whether the access of the PC is permitted when the PC accesses the central server, to confirm the class of the PC to which the access is permitted, to designate the data class reflecting the class of the PC to the data transmitted from the PC, and then to store the data in the storage and a data class identification information generated by processing the data class in the storage or a separate storage, wherein the data class identification information is obtained by mapping a unique hash value of the data transmitted and a class designated to the data transmitted.

2. The file synchronization and centralization system of claim 1, wherein the central server further includes a data version management unit which changes a name of the data to be stored in the storage to another name which is distinguished from the name of the data pre-stored in the storage when the same data as the data to be stored in the storage exists in the storage, and the processor further controls an operation of the data version management unit.

3. The file synchronization and centralization system of claim 1, wherein the data class identification information is obtained by mapping a unique value such as a hash value of the corresponding data and a class designated to the corresponding data.

\* \* \* \* \*